United States Patent
Golunski (10) Patent No.: US 11,133,741 B2
(45) Date of Patent: Sep. 28, 2021

(54) POWER SUPPLY DEVICE

(71) Applicant: UTC Fire & Security EMEA BVBA, Diegem (BE)

(72) Inventor: Witold Golunski, Gdansk (PL)

(73) Assignee: UTC FIRE & SECURITY EMEA BVBA, Diegem (BE)

( * ) Notice: Subject to any disclaimer, the term of this patent is extended or adjusted under 35 U.S.C. 154(b) by 0 days.

(21) Appl. No.: 16/905,294

(22) Filed: Jun. 18, 2020

(65) Prior Publication Data
US 2020/0403500 A1     Dec. 24, 2020

(30) Foreign Application Priority Data

Jun. 19, 2019   (EP) .................................. 19181395

(51) Int. Cl.
*H02M 3/06* (2006.01)

(52) U.S. Cl.
CPC .................................. *H02M 3/06* (2013.01)

(58) Field of Classification Search
None
See application file for complete search history.

(56) References Cited

U.S. PATENT DOCUMENTS

| | | | | |
|---|---|---|---|---|
| 4,860,188 A * | 8/1989 | Bailey | ..................... | H02J 1/102 363/65 |
| 5,319,536 A * | 6/1994 | Malik | ..................... | H02J 1/001 363/65 |
| 5,414,610 A * | 5/1995 | Brainard | ........... | H02M 3/33569 363/21.15 |
| 5,886,561 A * | 3/1999 | Eitan | ...................... | H02J 9/061 327/408 |
| 6,212,081 B1 * | 4/2001 | Sakai | ...................... | H02J 9/061 363/71 |
| 6,225,708 B1 * | 5/2001 | Furukawa | ............... | G06F 1/305 307/66 |
| 6,700,808 B2 * | 3/2004 | MacDonald | ............ | G06F 1/263 363/142 |

(Continued)

FOREIGN PATENT DOCUMENTS

| | | |
|---|---|---|
| WO | 2013094839 A1 | 6/2013 |
| WO | 2014094839 A1 | 6/2013 |

OTHER PUBLICATIONS

European Search Report for application EP 19183955, dated Jan. 3, 2020, 7 pages.

(Continued)

*Primary Examiner* — Jeffery S Zweizig
(74) *Attorney, Agent, or Firm* — Cantor Colburn LLP (57) ABSTRACT

There is provided a power supply device 100 for switching power to an output line 150 between a first power supply 120 and a parallel second power supply 122. The power supply device 100 comprises: a first converter 130 connected to the first power supply 120 and configured to output a first voltage in a first predetermined range; and a second converter 132 connected to the second power supply 122 and configured to output a second voltage in a second predetermined range. The outputs of the first and second converters 130, 132 are connected together on the output line 150, and the first and second converters 130, 132 are arranged to maintain a voltage on the output line 150 within a third predetermined range.

14 Claims, 3 Drawing Sheets

(56) References Cited

U.S. PATENT DOCUMENTS

| | | |
|---|---|---|
| 9,214,866 B2 * | 12/2015 | Nora ................. H02J 1/102 |
| 2009/0218984 A1 | 9/2009 | Parakulam |
| 2011/0001359 A1 | 1/2011 | Moon et al. |
| 2014/0091621 A1 | 4/2014 | Hsu et al. |
| 2014/0375288 A1 | 12/2014 | Nora |

OTHER PUBLICATIONS

European Search Report for application EP 1918395.5, dated Nov. 26, 2019, 7 pages.

\* cited by examiner

POWER SUPPLY DEVICE

FOREIGN PRIORITY

This application claims priority to European Patent Application No. 19181395.5, filed, Jun. 19, 2019, and all the benefits accruing therefrom under 35 U.S.C. § 119, the contents of which in its entirety are herein incorporated by reference.

FIELD

The invention relates to a power supply device, particularly to a power supply device for automatically switching an output between power supplies and maintaining a substantially constant output voltage.

BACKGROUND

For security panels and similar devices, such as those for controlling security systems or fire suppression systems, it may be operation critical that an output voltage is constant. Typically, such panels are powered from a primary power supply, but include a backup power supply in case of failure of the primary power supply. The second power supply is typically a battery or the like. If the primary power supply fails, and if the battery is not fully charged, the voltage on the output line may drop.

Further, some devices need regular testing to ensure that the battery is capable of supplying power in the event that the primary power supply fails. In these cases, the whole output load is regularly and frequently connected to the battery e.g. every day, every minute, every ten seconds etc. If the battery is not fully charged, the voltage on the output line may drop when the battery is supplying power, so that the output voltage fluctuates.

Existing devices have generally been considered suitable for their intended purposes, but improvements to reliability are desirable. For example, it is desirable to have an improved means of switching between power supplies, particularly for providing an uninterrupted supply of power, and/or an improved means for testing the status of a backup power supply.

SUMMARY

According to a first aspect of the invention there is provided a power supply device for switching power to an output line between a first power supply and a parallel second power supply, the power supply device comprising: a first power module connected to the first power supply and configured to output a first voltage in a first predetermined range; and a second power module connected to the second power supply and configured to output a second voltage in a second predetermined range; wherein the outputs of the first and second power modules are connected together on the output line; and wherein the first and second power modules are arranged to maintain a voltage on the output line within a third predetermined range.

The first power module and second power module are connected to the output line, and an output load may be connected to and powered via the output line. The output load will therefore be powered by whichever of the first power module and second power module is outputting a higher voltage, and therefore will be powered by the corresponding first or second power supply. Whichever of the first power module and second power module is supplying power to the output load may be considered to be the active or working power module (i.e. providing power from its power supply to the output load), and the other power module may be effectively inactive or dormant, but ready to supply power if needed, and thereby in standby. In standby, the inactive power module will be ready to take over the role of supplying power to the output load in the event that the voltage from the active power module drops too much.

For example, if the first voltage from the first power module is greater than the second voltage from the second power module, the first power module will supply power at the first voltage from the first power supply to the output line and may thereby provide power to the output load. The second power module may be inactive and in standby. If the first voltage drops below the second voltage, e.g. if the first power supply fails, then the second power module will supply power at the second voltage to the output line and may thereby provide power from the second power supply to the output load. If the second voltage is only slightly less than the first voltage, the voltage on the output line will not change significantly and hence a large fluctuation in the output voltage can be avoided.

The power modules are therefore arranged to maintain the voltage on the output line within the third predetermined range. The third predetermined range may be as wide as desired, but may be relatively small compared to preferred operating voltages of the output load. For example, the third predetermined range may be between 1% and 10% of the preferred output voltage. The third predetermined range may be between 0.1% and 1% of the preferred output voltage. The third predetermined range may span approximately 100 millivolts, 50 millivolts, or 20 millivolts. The first predetermined range and/or second predetermined range may also be relatively small compared to the preferred output voltage. For example, the first predetermined range and/or second predetermined range may be between 1% and 10% of the preferred output voltage. The predetermined ranges may be between 1% and 5% of the preferred output voltage.

The first power module may be a first converter. The first power module may be a first integrated circuit. The first power module may be a linear power module. The second power module may be a second converter. The second power module may be a second integrated circuit. The second power module may be a linear power module.

The first power supply may be a primary power supply and the second power supply may be a back-up power supply. For example, the first power supply may be a mains power supply and the second power supply may be a battery power supply.

The power supply device is therefore arranged to automatically and reliably switch between power supplies in the event of failure of the working supply. The power supply device does not require an additional microprocessor or other logic device, and may therefore be simpler, cheaper, and more reliable than other devices.

The power supply device may be a power supply switching device, e.g. a device for switching an output load between power supplies. The power supply device may be a power supply control device, e.g. a device for controlling switching of an output load between power supplies.

The first power module and the second power module may be configured so that the first predetermined range overlaps with the second predetermined range. The first power module may therefore be operable to output a first voltage either lower than the second voltage, or higher than the second voltage. The second power module may be operable to output a second voltage either lower than the first voltage or higher than the first voltage. The first and second predetermined ranges may partially overlap, or may fully overlap. They have the same extent, or they may have different extents. The first predetermined range and second predetermined range may there have the same upper limit and/or same lower limit.

The first power module may comprise a feedback line, and may be configured to change the first output voltage based on the voltage on the feedback line. The first power module may comprise or may be connected to a reference voltage and may be configured to change the first output voltage based on the feedback voltage on the feedback line and the reference voltage. If the feedback voltage is higher than the reference voltage, then the first power module may be configured to decrease the first output voltage. If the feedback voltage is lower than the reference voltage, then the first power module may be configured to increase the first output voltage. The first power module may be configured to increase the first output voltage if the feedback voltage drops and/or may be configured to decrease the first output voltage if the feedback voltage increases.

The second power module may also comprise a feedback line, and may be configured to operate under the same principles as the first power module i.e. increasing the second output voltage if the feedback voltage decreases, and/or decreasing the second output voltage if the feedback voltage increases.

That is, the second power module may comprise or may be connected to a reference voltage and may be configured to change the second output voltage based on the feedback voltage on the feedback line and the reference voltage. If the feedback voltage on the feedback line of the second power module is higher than the reference voltage of the second power module, then the second power module may be configured to decrease the second output voltage. If the feedback voltage is lower than the reference voltage, then the second power module may be configured to increase the second output voltage. The second power module may be configured to increase the second output voltage if the feedback voltage drops and/or may be configured to decrease the second output voltage if the feedback voltage increases.

The power supply device may comprise a first voltage divider arranged to control a feedback voltage on a feedback line of the first power module, and a second voltage divider arranged to control a feedback voltage on a feedback line of the second power module, wherein the first voltage divider and the second voltage divider are connected to the output line.

The first voltage divider may be connected to the output of the first power module, and the second voltage divider may also be connected to the output of the first power module. Both voltage dividers may therefore be commonly connected to the output line. The output of the second power module is connected to the output of the first power module, so both voltage dividers may also be commonly connected to the output of the second power module.

Voltages over the voltage dividers may therefore be proportional to the voltage on the output line, and the respective voltages on the feedback line to the first power module and on the feedback line of the second power module may be proportional to voltage on the output line. Therefore, a decrease in voltage on the output line may result in a decrease on the feedback lines of the respective power modules.

The first and second voltage dividers may be configured to determine which of the first power module and second power module will provide power during normal operation (and therefore which power module will be switched off) by configuring the voltages on the respective feedback lines appropriately (e.g. relative to the respective reference voltages). Since the outputs of the first and second power modules are both connected to the output line, and since the first and second feedback lines are also connected to the output line (e.g. via the first and second voltage dividers), the first and second power modules will operate to maintain voltage on the output line within the third predetermined range. Thus, one power module may output power from its associated power supply (i.e. at the first voltage), while the other output module may not output power from its associated power supply. As such only one of the first and second power modules may power the output line at a time. The power supply device may therefore be configured to switch power to the output line between the first power supply and the parallel second power supply by activating (e.g. outputting power from) either the first power module or the second power module while at the same time deactivating (e.g. preventing power output from) the other of the first power module and the second power module. That is, only one power module may be active and therefore providing power to the output line (at least substantially) at a given time.

For example, if the power supply device is configured such that the first power module is to be a primary power module during use, the first voltage divider may be configured so that the voltage on the first feedback line is such that the output of the first power module is maintained (e.g. the voltage on the first feedback line matches the first reference voltage, so that the first power module does not change its output voltage). The second voltage divider may be configured so that the voltage on the second feedback line causes the output from the second power module to shut off (e.g. the voltage on the second feedback line may be greater than the second reference voltage, so that the second power module reduced its output to substantially nil) when the first power module is operating normally. If the first power supply were to fail, then the output voltage from the first power module would drop, and the voltage on the second feedback line would also drop. When the voltage on the second feedback line falls below second reference voltage, the second power module increases its output voltage e.g. until the voltage on the second feedback line matches the second reference voltage. The power supply device therefore automatically switches power to the output line from the first power supply to the second power supply. (This process is described in more detail below with reference to the specific embodiments).

The power supply device may comprise a control arrangement configured to control the output voltages of the first and second power modules within the respective first and second predetermined ranges, and thereby control which of the first power module and second power module provides power to the output line. Since the power module with the higher output voltage will provide power to the output line e.g. to the output load, the control arrangement is operable to switch the output between power supplies. For example, if the first voltage is higher than the second voltage, the first power supply will be supplying power to the output load and the second power module will be in standby. The control arrangement may reduce the first voltage so that it is lower than the second voltage, at which point the second power module will become active and supply power from the second power supply to the output load while the first power module goes into standby. The controller may also be operable to reduce the second voltage to switch power supplies again, or may increase the first voltage.

Therefore, the control arrangement may be used to test viability of the second power supply e.g. test if a battery is sufficiently charged to provide enough power in the event of failure of a mains supply.

The control arrangement may be configured to increase and/or decrease voltage on the feedback line of the first power module; and/or may be configured to increase and/or decrease voltage on the feedback line of the second power module. The controller may thereby be arranged to increase and/or decrease the first and second voltages. The control arrangement may therefore be operable to vary the first and second voltages within the first and second predetermined ranges as needed for switching between power supplies.

The control arrangement may be arranged to simultaneously increase voltage on the feedback line of the first power module while decreasing voltage on the feedback line of the second power module; and/or to simultaneously decrease voltage on the feedback line of the first power module while increasing voltage on the feedback line of the second power module. Therefore, switching of the power supplies may be efficient and any voltage drop on the output line may be kept to a minimum, since the second voltage will increase to take over power supply from the first voltage as it decreases. The control arrangement may therefore comprise means for providing opposite logical control signals to the feedback lines of the first and second power modules. For example, it may comprise means for providing two separate, opposite signals.

The power supply device may comprise a single control input for controlling the control arrangement. The control arrangement may provide a single control line connected to parallel lines which themselves are each connected to the feedback lines of the power modules, with a logical inverter on one of the parallel lines. For example, the control arrangement may comprise a NOT gate arranged to provide a signal on the line to the feedback line of the first power module, which signal is therefore opposite to the signal on the line to the feedback line of the second power module. The voltage on the first feedback line may therefore be increased when the voltage on the second feedback line is decreased, so that the first output voltage of the first power module will be decreased while the second output voltage of the second power module will be increased, and vice-versa. The control arrangement may therefore provide a simple means for switching between power supplies while keeping any voltage fluctuation on the outline to a minimum.

The device may comprise a controller configured to periodically switch between the first power supply and second power supply. The controller may be configured to periodically check the status of the second power supply e.g. to ensure that a back-up power supply is available. Due to the present disclosure, such switching may be less disruptive than that achieved by known systems because any voltage fluctuation is reduce compared to those known systems. Further, it is not necessary to switch off either power supply in order to test the other, and if one power supply should fail during such testing, power will be supplied automatically from the other power supply. The power supply device therefore maintains redundancy at all times.

The control arrangement may comprise a first control resistor connected to the feedback line for varying voltage on the feedback line by varying current through the first control resistor. The control resistor may be connected in series to the feedback line, and in parallel to the resistors of the first voltage divider e.g. connected to a point between the resistors of the first voltage divider. The control arrangement may comprise another control resistor in series with the first control resistor, and may comprise a capacitor connected between the resistors.

The control arrangement may comprise a second control resistor connected to the feedback line of the second power module for varying voltage on the feedback by varying current through the second control resistor. The second control resistor may be connected in series to the feedback line of the second power module, and in parallel to the resistors of the second voltage divider. The control arrangement may comprise another control resistor in series with the second control resistor, and may comprise a second capacitor connected between the resistors.

The first control resistor may have a resistance larger than that of either or both of the resistors of the first voltage divider. The first control resistor may have a resistance at least an order of magnitude greater than either or both of the resistors of the first voltage divider. The first control resistor may have a resistance a plurality of orders of magnitude greater than either or both of the resistors of the first voltage divider. Therefore, changes in the current through the first control resistor will have a proportionally smaller effect on the voltage on the first feedback line, and the control arrangement will therefore provide fine control over the first output voltage.

The second control resistor may have a resistance larger than that of either or both of the resistors of the second voltage divider. The second control resistor may have a resistance at least an order of magnitude greater than either or both of the resistors of the second voltage divider. The second control resistor may have a resistance a plurality of orders of magnitude greater than either or both of the resistors of the second voltage divider.

The first predetermined range may be between 13.6V and 14.0V. The first predetermined range may be between 13.6V and 13.8V. The second predetermined range may be between 13.4V and 13.8V. The third predetermined range may be between 13.6V and 13.8V. The first predetermined range may be between 13.7V and 13.9V. The second predetermined range may be between 13.5V and 13.7V. The predetermined ranges may be any suitable ranges relevant for the desired output voltage.

The first power module and/or second power module may be an integrated circuit. The first power module and/or second power module may be a converter. The first convert and/or second converter may be a linear or switch mode converter. The first converter may be a buck converter. The second converter may be a boost converter. The first and/or second converters may be switched mode power supplies (SMPS).

The power supply device may be configured for use in a security panel, and the invention may comprise a security panel and/or a security system comprising the power supply device as described herein with reference to the first aspect of the invention.

According to a second aspect of the invention there is provided a method of switching an output line between a first power supply and a second power supply, comprising: providing a first power module and a second power module, wherein the outputs of the first and second power modules are connected together on the output line, decreasing an output voltage of the first power module and simultaneously increasing an output voltage of the second power module to switch between the power supplies and maintain the voltage on the output line within a predetermined range.

The method may comprise providing the features of the invention as described herein with reference to the first aspect. The method may comprise using the power supply device as described herein with reference to the first aspect of the invention.

DRAWING DESCRIPTION

Certain embodiments of the invention are described below by way of example only and with reference to the figures in which.

DETAILED DESCRIPTION

Figure 1:
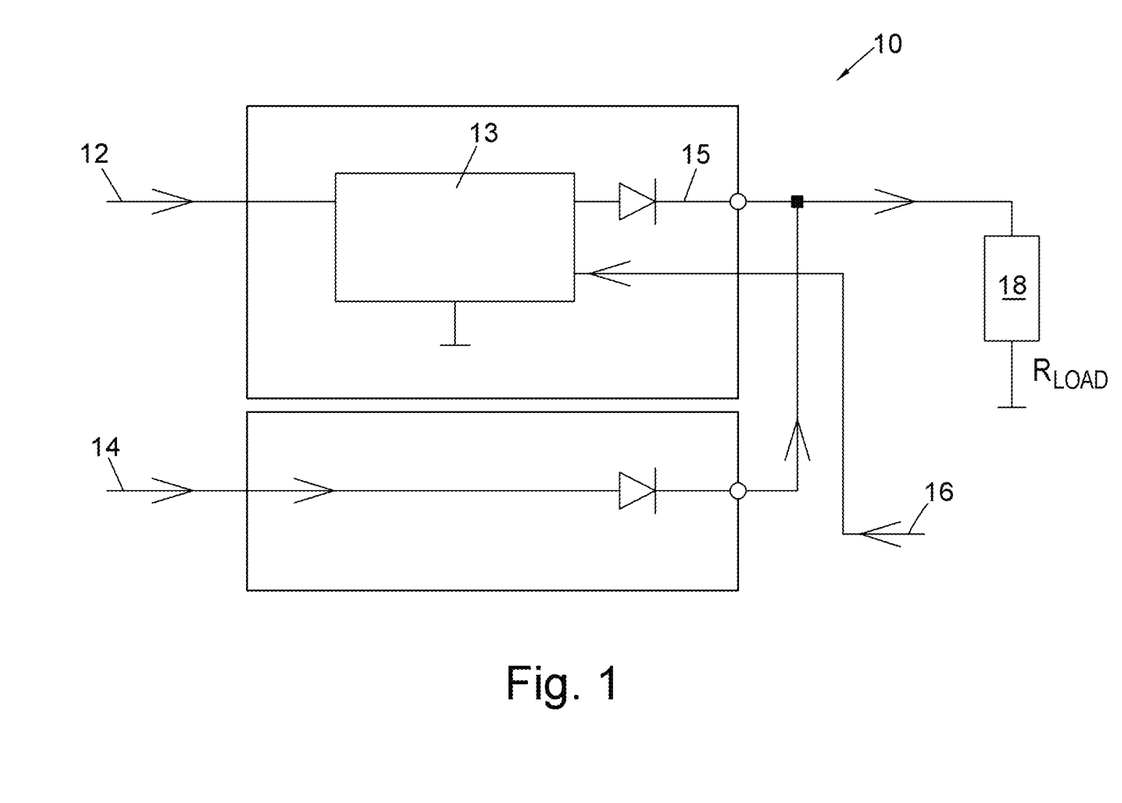
FIG. 1 shows a known arrangement for providing a back-up power supply to an output load.

FIG. 1 shows a power supply device 10 for providing power to an output load 18. The device 10 comprises a mains (for example) power supply 12 and a battery 14, both connected in parallel via respective diodes to the output load 18. The voltage on an output line 15 from the main power is determined by a supply unit 13. In the event of failure of the mains power supply 12, the battery 14 will provide backup power to the output load 18. If the battery 14 is not fully charged or is damaged, the output voltage may drop.

The device also includes a line 16 into the supply unit 13 for controlling the output voltage from the supply unit 13 to output line 15. The desired output voltage at the output load 18 may be about 13.8V, and the battery may be able to supply between about 9V and 13.8V depending on its state of charge.

To test that the battery 14 is capable of supplying backup power, the voltage from the supply unit 13 may be temporarily reduced (e.g. to less than about 9V) so that the full load of the output 18 is connected to the battery 14. If the battery 14 is tested periodically, and if the battery is not fully charged, the output voltage will fluctuate. Such fluctuation is undesirable.

Figure 2:
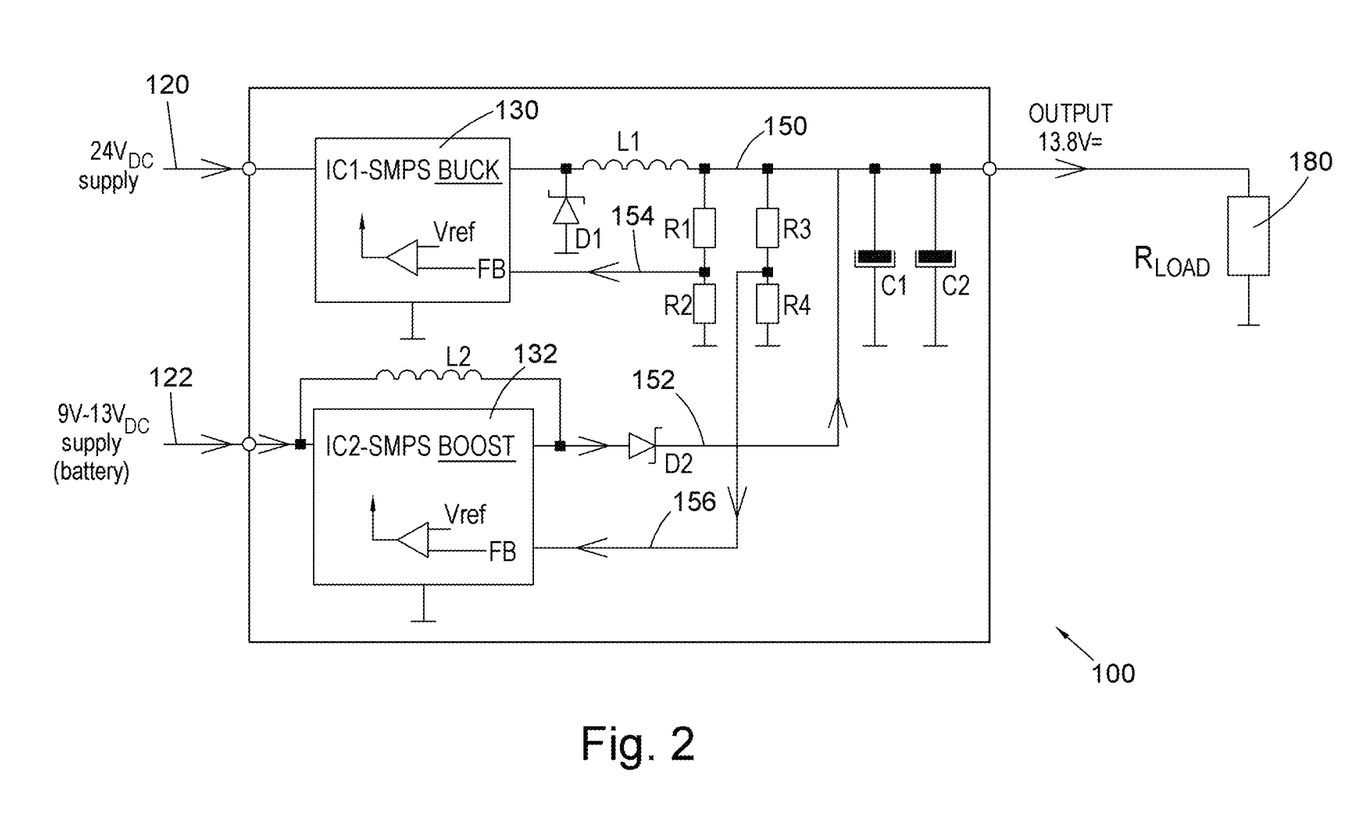
FIG. 2 shows a power supply device for automatically switching between power supplies.

FIG. 2 shows a power supply switching device 100 which automatically switches between power supplies to an output load 180 in the event that one power supply fails. The device 100 comprises a first power supply 120 (e.g. a mains supply at about 24V) and a second power supply 122 (e.g. a battery at about 9V to 13.8V). The first and second power supplies 120, 122 are connected in parallel to the output load 180.

The device 100 also comprises a first power module in the form of a first converter 130 arranged to receive power from the first power supply 120. The first converter 130 may be a linear or step-down converter (i.e. a buck converter), and/or may be arranged to output a predetermined voltage to an output line 150 on which the output load 180 is connected. For example, the desired voltage at the output line may be about 13.8V, and the first converter 130 may be configured to convert a 24V voltage from the mains supply 120 and output a voltage of about 13.8V to line 150.

A second power module in the form of a second converter 132 is arranged to receive power from the second power supply 122. The second converter 132 may be configured to convert the voltage from the second power supply 122 to a predetermined voltage and output the predetermined voltage to line 152 which is connected to line 150. The outputs of each converter are therefore connected. The second converter 132 may be a step-up converter (i.e. a boost converter) so that if the battery 122 is discharged, the output voltage may still be maintained at a desired level (i.e. boosted to a required voltage).

The first converter 130 also has a first feedback line 154 connected to a first voltage divider formed by resistors R1 and R2 (e.g. a first resistor divider R1, R2). The first voltage divider R1, R2 thus determines the voltage on the first feedback line 154 of the first converter 130, depending on the voltage on line 150. The first feedback line 154 provides voltage to an integrated circuit of the first converter 130.

The internal construction of the power supplies i.e. the first and second converters 130 and 132 contain an internal reference voltage. The converter compares the reference voltage to a feedback voltage on the feedback line into the converter, and the output voltage from the converter is regulated based on the feedback voltage to provide a desired output voltage. If the feedback voltage is too high, then the output voltage will be decreased. If the feedback voltage is too low, then the output voltage will be increased. The converters may comprise integral circuits or may use a discrete solution.

The second converter 132 also has a feedback line 156 which is connected to a second voltage divider formed by resistors R3 and R4 (e.g. a second resistor divider R3, R4). The second voltage divider R3, R4 controls the voltage on the second feedback line 156 depending on the voltage on the line 150. The second feedback line 156 provides voltage to an integrated circuit of the second converter 132.

The first voltage divider R1, R2 and the second voltage divider R3, R4 may be configured to provide substantially (e.g. almost) the same output voltage for both converters. The first converter 130 may be configured to provide a slightly higher output voltage than the second converter 132, so that when both power supplies are functioning correctly the output load 180 will be supplied by the first power supply 120.

Whichever of the first and second converter 130, 132 has a higher output voltage will supply power to the output load 180. If voltage on the feedback line 156, 154 of the other converter 132, 130 is higher than the internal reference voltage, then the corresponding output of the converter 130, 132 will be decreased and consequently it will be switched off (i.e. the other converter will supply power to the load). Therefore, in the event of a failure of a power supply, e.g. the first power supply 120, the other converter for the other power supply, e.g. the second converter 132, will automatically supply power to the output load 180. No additional control circuits or the like are needed, and the switch is therefore automatic and immediate.

If the first power supply 120 fails, then the first converter 130 will lose its input power supply and therefore will not be able to provide the required output voltage. Voltage on the output line 150 then starts to decrease. At the same time, voltages on feedback lines 154, 156 also start to fall, because they are proportional to voltage on the output line 150 (since they are connected thereto only by respective voltage dividers). The moment that the feedback voltage to the second converter 132 on feedback line 156 reaches (e.g. is equal to) or drops below the internal reference voltage of the second converter 132, the second converter 132 starts to work to provide the required output voltage to the load 180. The output voltage set by the second voltage divider R3, R4 is only a little lower than the output voltage of the first converter 130 set by the first voltage divider R1, R2 during normal work, and therefore voltage fluctuation on the line 150 is minimal. For example, the first output voltage for the first converter 130 may be about 13.8V, and/or the second output from the second converter may be about 13.6V or about 13.8V.

When the first power supply 120 returns (e.g. after failure) then the first converter 130 has its proper input voltage restored. Voltage on the feedback line 154 will be lower than the internal reference voltage of the first converter 130, and therefore the first converter 130 will start to provide output and the voltage on the output line 150 will start to increase until voltage on the feedback line 154 reaches (e.g. is equal to) the internal reference voltage of the first converter 130. Because this voltage is only a little higher than the output voltage of the second converter 132, the rise of the output voltage on the output line 150 is minimal. Again, voltage fluctuation on the output line 150 is kept low. At the same time, because voltage on the output line 150 rises a little, voltage on the feedback line 156 becomes higher than the internal reference voltage of the second converter 132. Therefore, the second converter 132 ceases to provide power to the output load i.e. it is switched off. Therefore, once the first power supply is restored, power to the output load 180 is again provided by the first converter 130 from the first power supply 120.

The device 100 may comprises a pair of capacitors C1 and C2 connected to the output line 150, which capacitors provide an output filter on the output line 150. Since the first and second converters 130 and 132 are connected in parallel, they therefore both use the same output filter provided by capacitors C1, C2.

The device 100 may comprise additional components such as diodes D1 and D2, and inductors L1 and L2, which components are provided for the first and second converts 130 and 132 which in the depicted example are Switch Mode Power Supplies (SMPS). If alternative units to the first and second converters 130 and 132 were used, the components D1, D2, L1 and L2 may not be required.

Figure 3:
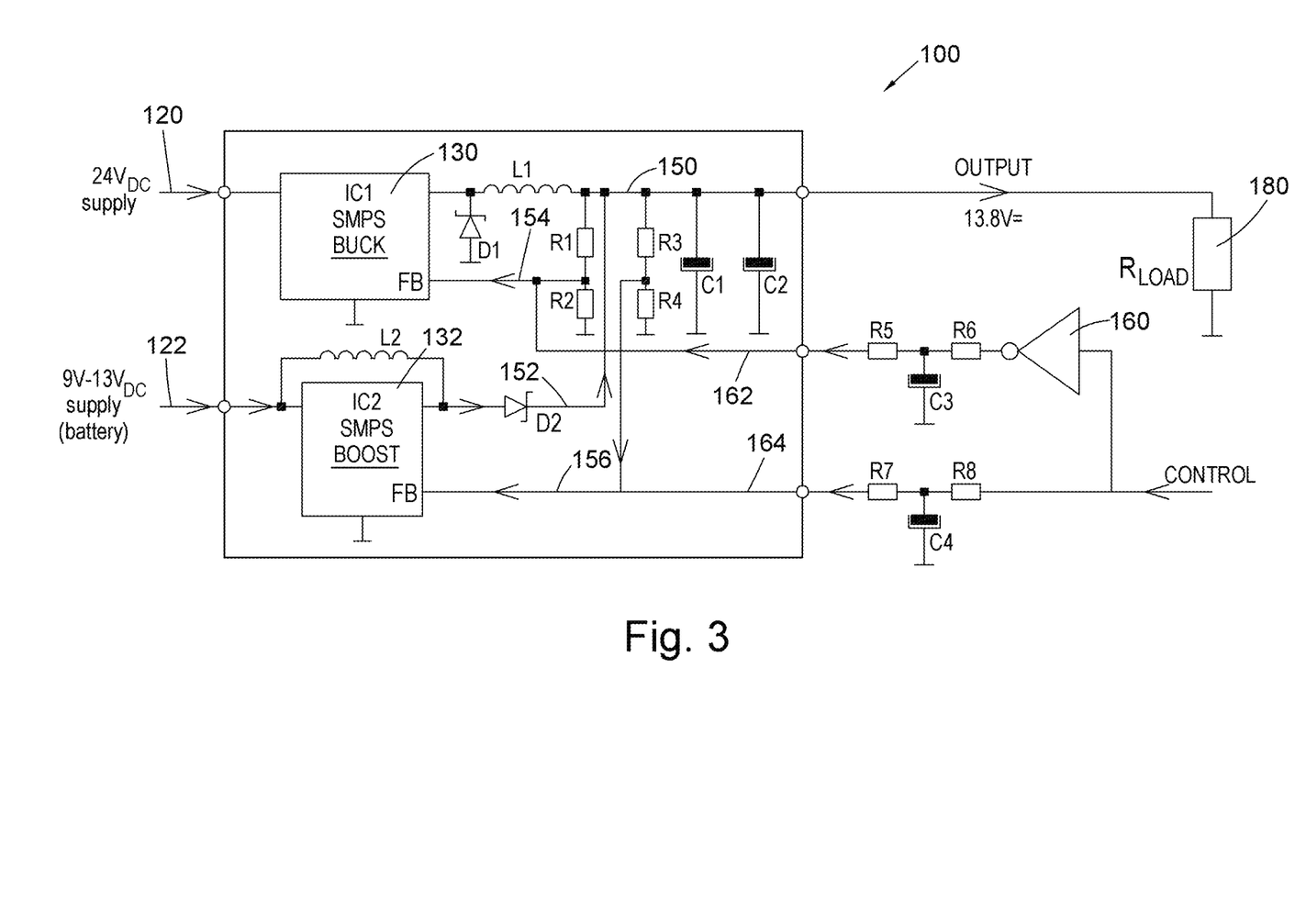
FIG. 3 shows a power supply device for automatically switching between power supplies and for controlling switching of between the power supplies.

FIG. 3 shows another power supply device 100 for switching an output load between the first and second power supplies 120 and 122, and for controlling that switching. The device 100 of FIG. 3 is the same as that of FIG. 2 but further includes a control arrangement for controlling switching between the power supplies 120, 122. The control arrangement includes resistors R5 and R7, and a line for control signals into the device 100.

The resistor R5 is provided on a line 162 so that the voltage on the first feedback line 154 can be increased or decreased by decreasing or increasing voltage connected to the resistor R5. Such a voltage change causes change of the current flowing through R5. If the voltage connected to R5 is increased (e.g. a higher voltage at the connection point of the resistor R5 and a resistor R6 shown in FIG. 3), then the current through the resistor R5 is also increased. The voltage on the first feedback line 154 will therefore also increase, causing the first converter 130 to decrease its output voltage. If the current through the resistor R5 is decreased or reversed (e.g. a lower voltage at the connection point of the resistor R5 and the resistor R6), the voltage on the feedback line 154 will also decrease, causing the first converter 130 to increase the output voltage. In this way, the output voltage of the first converter 130 can be controlled.

The resistor R5 may have a resistance much greater than the resistance of the resistors R1 and/or R2, which are connected thereto in parallel. The resistor R5 may have a resistance an order of magnitude or more greater than both and/or either of the resistors R1, R2 of the first voltage divider. Therefore, current changes through R5 will result in small voltage changes on the feedback line 154, thereby providing fine control over the output voltage of the first converter 130.

Another resistor R7 is provided on a line 164 connected to the second feedback line 156, so that the voltage on the second feedback line 156 can be increased or decreased in the same way that the resistor R5 is used to control voltage on the first feedback line 154. The resistor R7 may have a resistance much greater than that of the resistors R3 and/or R4 which are connected thereto in parallel, and may be an order of magnitude or more greater than either or both of the resistors R3 and R4.

Therefore, an increase or decrease of the voltage connected to either the resistor R5 or the resistor R7 will cause a corresponding decrease or increase in the output voltage of the first converter 130 or second converter 132 controlled thereby. Power to the output load 180 will be provided by the converter which has the higher output voltage set (i.e. the lower voltage connected to the resistor R5 or R7).

The control apparatus may be simplified by ensuring that control signals connected to the resistors R5 and R7 have opposite logical values, because in that way only one converter 130 or 132 will be set as the working converter i.e. will be active.

For example, the device may comprise a NOT gate 160 arranged to ensure that logical voltages connected to the resistors R6 and R8 (and further to the resistors R5 and R7) are opposite. Therefore, it is possible to switch which of the converters 130, 132 is the working converter using only a single signal on a single control line. Alternatively, it is also possible, though less efficient, to use two separate control lines, with opposite logical voltages.

Additionally, because the control signals into the feedback lines 154 and 156 cause only small changes of the output voltages of the respective first and second converters 130 and 132 (because the resistors R5 and R7 have much greater resistances than the co-working voltage dividers), then the device output voltage will never be lower than the lowest output voltage of either of the converters, even if one of the first power supply 120 or second power supply 122 fails.

The control arrangement therefore allows the output load 180 to be switched between power supplies by an appropriate single control signal. As described above, the converter with the higher output voltage will supply power to the output load, and the control arrangement allows the output voltage of a chosen converter to be increased while simultaneously decreasing the output voltage of the other, and therefore allows switching of the output load 180 between the first power supply 120 and second power supply 122.

In order to ensure smooth control over the voltage changes, the resistor R6 is provided in series with the resistor R5, and a capacitor C3 is connected between the resistor R5 and the resistor R6. In a similar manner, the resistor R8 is provided in series with the resistor R7 and a capacitor C4 is connected between them. The capacitors C3 and C4, and the resistors R6 and R8 thus function to provide smooth switching of the output power supply.

The invention therefore provides a means for simply testing the battery that does not cause the output voltage to fluctuate. Further, if one of the power supplies fails, the device automatically and instantly switches to the other power supply while output voltage is maintained at a substantially constant level. It is also not necessary to switch off one power supply to test the other, and the invention therefore always ensures redundancy and hence finds particular application in security panels and security systems.

Moreover, because the resistances of resistors R5 and R7 are much larger than the resistances of resistors R1/R2 and R3/R4 respectively, voltages on the control lines 162, 164 only change voltages on the feedback lines 154, 156 by proportionately small amounts, and therefore cannot be used to force either power module to remain deactivated.

What is claimed is:

1. A power supply device for switching power to an output line (150) between a first power supply (120) and a parallel second power supply (122), the power supply device comprising:
   a first power module (130) connected to the first power supply (120) and configured to output a first voltage in a first predetermined range; and
   a second power module (132) connected to the second power supply (122) and configured to output a second voltage in a second predetermined range;
   a control arrangement configured to control the output voltages of the first and second power modules (130, 132) within the respective first and second predetermined ranges, and thereby control which of the first power module (130) and second power module (132) provides power to the output line (150);
   wherein the outputs of the first and second power modules are connected together on the output line (150); and
   wherein the first and second power modules (130, 132) are arranged to maintain a voltage on the output line (150) within a third predetermined range.

2. A power supply device as claimed in claim 1, wherein the first power module (130) and the second power module (132) are configured so that the first predetermined range overlaps with the second predetermined range.

3. A power supply device as claimed in claim 1, wherein the control arrangement is configured to increase and/or decrease voltage on the feedback line (154) of the first power module (130); and/or is configured to increase and/or decrease voltage on the feedback line (156) of the second power module (132).

4. A power supply device as claimed in claim 3, wherein the control arrangement is arranged to simultaneously increase voltage on the feedback line (154) of the first power module (130) while decreasing voltage on the feedback line (156) of the second power module (132); and/or to simultaneously decrease voltage on the feedback line (154) of the first power module (130) while increasing voltage on the feedback line (156) of the second power module (132).

5. A power supply device as claimed in claim 4, comprising a single control input for controlling the control arrangement.

6. A power supply device as claimed in claim 1, wherein the control arrangement comprises a first control resistor (R5) connected to a feedback line (154) of the first power module (130) for varying voltage on the feedback line (154) of the first power module (130) by varying current through the first control resistor (R5).

7. A power supply switching device as claimed in claim 6, wherein the control arrangement comprises a second control resistor (R7) connected to the feedback line (156) of the second converter (132) for varying voltage on the feedback line (156) by varying current through the second control resistor (R7).

8. A power supply device as claimed in claim 6, wherein the first control resistor (R5) has a resistance at least an order of magnitude greater than either or both of the resistors of a first voltage divider (R1, R2), the first voltage divider being arranged to control a feedback voltage on the feedback line (154) of the first power module (130).

9. A power supply device as claimed in claim 1, wherein the first predetermined range is 13.6V to 14.0V, and/or wherein the second predetermined range is 13.4V to 13.8V.

10. A power supply device as claimed in claim 1, wherein the third predetermined range is 13.6V to 13.8V.

11. A power supply device as claimed in claim 1, wherein the first power module (130) and/or second power module (132) is a linear or switch mode converter.

12. A power supply device for switching power to an output line (150) between a first power supply (120) and a parallel second power supply (122), the power supply device comprising:
   a first power module (130) connected to the first power supply (120) and configured to output a first voltage in a first predetermined range;
   a second power module (132) connected to the second power supply (122) and configured to output a second voltage in a second predetermined range; and
   a first voltage divider (R1, R2) arranged to control a feedback voltage on a feedback line (154) of the first power module (130), and a second voltage divider (R3, R4) arranged to control a feedback voltage on a feedback line (156) of the second power module (132), wherein the first voltage divider (R1, R2) and the second voltage divider (R3, R4) are connected to the output line (150);
   wherein the outputs of the first and second power modules are connected together on the output line (150); and
   wherein the first and second power modules (130, 132) are arranged to maintain a voltage on the output line (150) within a third predetermined range.

13. A power supply device for switching power to an output line (150) between a first power supply (120) and a parallel second power supply (122), the power supply device comprising:
   a first power module (130) connected to the first power supply (120) and configured to output a first voltage in a first predetermined range;
   a second power module (132) connected to the second power supply (122) and configured to output a second voltage in a second predetermined range;
   a controller configured to periodically switch between the first power supply (120) and second power supply (122);
   wherein the outputs of the first and second power modules are connected together on the output line (150); and
   wherein the first and second power modules (130, 132) are arranged to maintain a voltage on the output line (150) within a third predetermined range.

14. A method of switching an output line (150) between a first power supply (120) and a second power supply (122), comprising:
   providing a first power module (130) and a second power module (132), wherein the outputs of the first and second power modules (130, 132) are connected together on the output line (150); and
   decreasing an output voltage of the first power module (130) and simultaneously increasing an output voltage of the second power module (132) to switch between the power supplies (120, 122) and maintain the voltage on the output line (150) within a predetermined range.

* * * * *